(12) United States Patent
Rana et al.

(10) Patent No.: US 10,769,572 B2
(45) Date of Patent: Sep. 8, 2020

(54) METHOD AND SYSTEM FOR DETERMINING AN OPTIMAL STRATEGY PERTAINING TO A BUSINESS OPPORTUNITY IN COGNITIVE DECISION MAKING

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

( * ) Notice: Subject to any disclaimer, the term of this patent is extended or adjusted under 35 U.S.C. 154(b) by 71 days.

(21) Appl. No.: 15/788,368

(22) Filed: Oct. 19, 2017

(65) Prior Publication Data

US 2018/0114163 A1 Apr. 26, 2018

Related U.S. Application Data

(60) Provisional application No. 62/410,726, filed on Oct. 20, 2016.

(51) Int. Cl.

| | |
|---|---|
| *G06Q 10/00* | (2012.01) |
| *G06Q 10/06* | (2012.01) |
| *G06N 5/02* | (2006.01) |
| *G06N 3/08* | (2006.01) |
| *G06Q 10/10* | (2012.01) |
| *G06F 16/903* | (2019.01) |

(Continued)

(52) U.S. Cl.
CPC ....... *G06Q 10/0637* (2013.01); *G06F 16/903* (2019.01); *G06F 16/904* (2019.01);
(Continued)

(58) Field of Classification Search
None
See application file for complete search history.

(56) References Cited

U.S. PATENT DOCUMENTS

| | | | |
|---|---|---|---|
| 5,963,919 A | 10/1999 | Brinkley et al. | |
| 8,204,809 B1 * | 6/2012 | Wise | G06Q 40/06 705/35 |

(Continued)

OTHER PUBLICATIONS

Junghwan Kim, Jaeki Song, Donald, R. Jones, The Cognitive Selection Framework of Knowledge Acquisition Strategy in Virtual Communities, 2010.

*Primary Examiner* — Gurkanwaljit Singh
(74) *Attorney, Agent, or Firm* — FisherBroyles, LLP; Susan M. Oiler

(57) ABSTRACT

Disclosed is a system for determining an optimal strategy pertaining to a business opportunity. In order to determine the optimal strategy, initially, a strategy type selection module stores a set of strategies in a system database. In one aspect, each strategy, of the set of strategies, may be associated to one or more business opportunities. Subsequently, the strategy type selection module selects a subset of the set of strategies applicable to a business opportunity of the one or more business opportunities. In one aspect, the subset may be selected based on a set of parameters associated to the business opportunity. Post selection of the subset, a strategy optimizer module analyzes each strategy of the subset by using one or more predefined computational libraries. In one aspect, a strategy, of the subset, may be analyzed to determine an impact of the strategy. After analyzing each strategy, the strategy optimizer module determines one or more strategies, of the subset, to be implemented based on the impact, pertaining to the one or more strategies, and a set of Key Performance Indicators (KPI) associated to the business opportunity.

9 Claims, 4 Drawing Sheets

(51) Int. Cl.
 *G06F 16/904* (2019.01)
 *G06N 20/00* (2019.01)

(52) U.S. Cl.
 CPC ......... *G06F 16/90335* (2019.01); *G06N 3/08* (2013.01); *G06N 5/022* (2013.01); *G06N 20/00* (2019.01); *G06Q 10/10* (2013.01)

(56) References Cited

U.S. PATENT DOCUMENTS

| | | | | |
|---|---|---|---|---|
| 8,214,238 | B1* | 7/2012 | Fairfield | G06Q 10/063 705/7.11 |
| 8,311,863 | B1* | 11/2012 | Kemp | G06Q 10/0639 705/7.11 |
| 2003/0130884 | A1* | 7/2003 | Michaluk | G06Q 10/0637 705/7.36 |
| 2007/0094060 | A1* | 4/2007 | Apps | G06Q 10/00 705/7.36 |
| 2008/0015871 | A1* | 1/2008 | Eder | G06Q 10/067 706/21 |
| 2009/0018891 | A1* | 1/2009 | Eder | G06Q 10/06 705/7.28 |
| 2013/0024225 | A1 | 1/2013 | Perry et al. | |
| 2013/0339099 | A1* | 12/2013 | Aidroos | G06Q 50/01 705/7.36 |
| 2014/0058794 | A1* | 2/2014 | Malov | G06Q 10/083 705/7.31 |

* cited by examiner

METHOD AND SYSTEM FOR DETERMINING AN OPTIMAL STRATEGY PERTAINING TO A BUSINESS OPPORTUNITY IN COGNITIVE DECISION MAKING

CROSS REFERENCE TO RELATED APPLICATIONS

This patent application claims priority from U.S. Provisional Application No. 62/410,726 filed on Oct. 20, 2016, the entirety of which is hereby incorporated by reference.

TECHNICAL FIELD

The present disclosure described herein, in general, relates to determining an optimal strategy pertaining to a business opportunity in a cognitive decision-making framework.

BACKGROUND

Continuous business improvement initiatives in the past were predominantly driven by the notion of quality. Methods and systems were put in place to track defects in processes, and to generate KPI's (key performance indicators) based on quality driven metrics and measurements. It was well accepted across business sectors that quality is a huge differentiator, and higher quality leads to higher value. These notions were subsequently challenged by the need for business agility and the resulting imperative to function effectively in spite of imperfect information and/or processes.

Most methods and systems of the prior art do not lend themselves well to the context of modern businesses where big data is the norm and the causal impact of a real-time fluctuation in business environment can be immediate and significant. Businesses are struggling on multiple fronts to get on the bandwagon of this big data led frontier of business performance optimization. Notwithstanding the huge skills gap and immaturity of big data engineering technologies, the fundamental issue is the lack of a coherent framework for business performance optimization that incorporates big data and advanced analytics at its core. In addition, the immaturity of the big data engineering technologies, many companies are unable to systematically and consistently identify, develop, and create substantial new growth opportunities from the big data for the business interest. This may lead to a huge loss of business opportunity and other activities that generally build business slowly.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for determining an optimal strategy pertaining to a business opportunity and the concepts are further described below in the detailed description. This summary is not intended to identify essential features of the claimed subject matter nor is it intended for use in determining or limiting the scope of the claimed subject matter.

In one implementation, a strategy computation system for determining an optimal strategy pertaining to a business opportunity is disclosed. The strategy computation system may comprise a processor and a memory coupled to the processor. The processor may execute a plurality of modules present in the memory. The plurality of modules may comprise a strategy type selection module and a strategy optimizer module. The strategy type selection module may store a set of strategies in a system database. In one aspect, each strategy, of the set of strategies, may be associated to one or more business opportunities. The strategy type selection module may further select a subset of the set of strategies applicable to a business opportunity of the one or more business opportunities. In one aspect, the subset may be selected based on a set of parameters associated to the business opportunity. The strategy optimizer module may analyze each strategy of the subset by using one or more predefined computational libraries. In one aspect, a strategy, of the subset, may be analyzed to determine an impact of the strategy. The strategy optimizer module may further determine one or more strategies of the subset, to be implemented, based on the impact, pertaining to the one or more strategies, and a set of Key Performance Indicators (KPI) associated to the business opportunity thereby determining an optimal strategy pertaining to the business opportunity.

In another implementation, a method for determining an optimal strategy pertaining to a business opportunity is disclosed. In order to determine the optimal strategy, initially, a set of strategies may be stored in a system database. In one aspect, each strategy, of the set of strategies, may be associated to one or more business opportunities. Subsequently, a subset of the set of strategies applicable to a business opportunity of the one or more business opportunities may be selected. In one aspect, the subset may be selected based on a set of parameters associated to the business opportunity. Post selection of the subset, each strategy of the subset may be analyzed by using one or more predefined computational libraries. In one aspect, a strategy, of the subset, may be analyzed to determine an impact of the strategy. After analyzing each strategy, one or more strategies, of the subset, to be implemented may be determined based on the impact, pertaining to the one or more strategies, and a set of Key Performance Indicators (KPI) associated to the business opportunity. In one aspect, the aforementioned method for determining the optimal strategy may be performed by a processor using programmed instructions stored in a memory of the strategy computation system.

In yet another implementation, non-transitory computer readable medium embodying a program executable in a computing device for determining an optimal strategy pertaining to a business opportunity is disclosed. The program may comprise a program code for storing a set of strategies in a system database, wherein each strategy, of the set of strategies, is associated to one or more business opportunities. The program may further comprise a program code for selecting a subset of the set of strategies applicable to a business opportunity of the one or more business opportunities, wherein the subset is selected based on a set of parameters associated to the business opportunity. The program may further comprise a program code for analyzing each strategy of the subset by using one or more predefined computational libraries, wherein a strategy, of the subset, is analyzed to determine an impact of the strategy. The program may further comprise a program code for determining one or more strategies of the subset to be implemented based on the impact, pertaining to the one or more strategies, and a set of Key Performance Indicators (KPI) associated to the business opportunity thereby determining an optimal strategy pertaining to the business opportunity.

BRIEF DESCRIPTION OF THE DRAWINGS

The foregoing detailed description of embodiments is better understood when read in conjunction with the appended drawing. For the purpose of illustrating the disclosure, there is shown in the present document example constructions of the disclosure; however, the disclosure is not limited to the specific methods and apparatus disclosed in the document and the drawings.

The detailed description is described with reference to the accompanying figure. In the figure, the left-most digit(s) of a reference number identifies the figure in which the reference number first appears. The same numbers are used throughout the drawings to refer like features and components.

Figure 1:
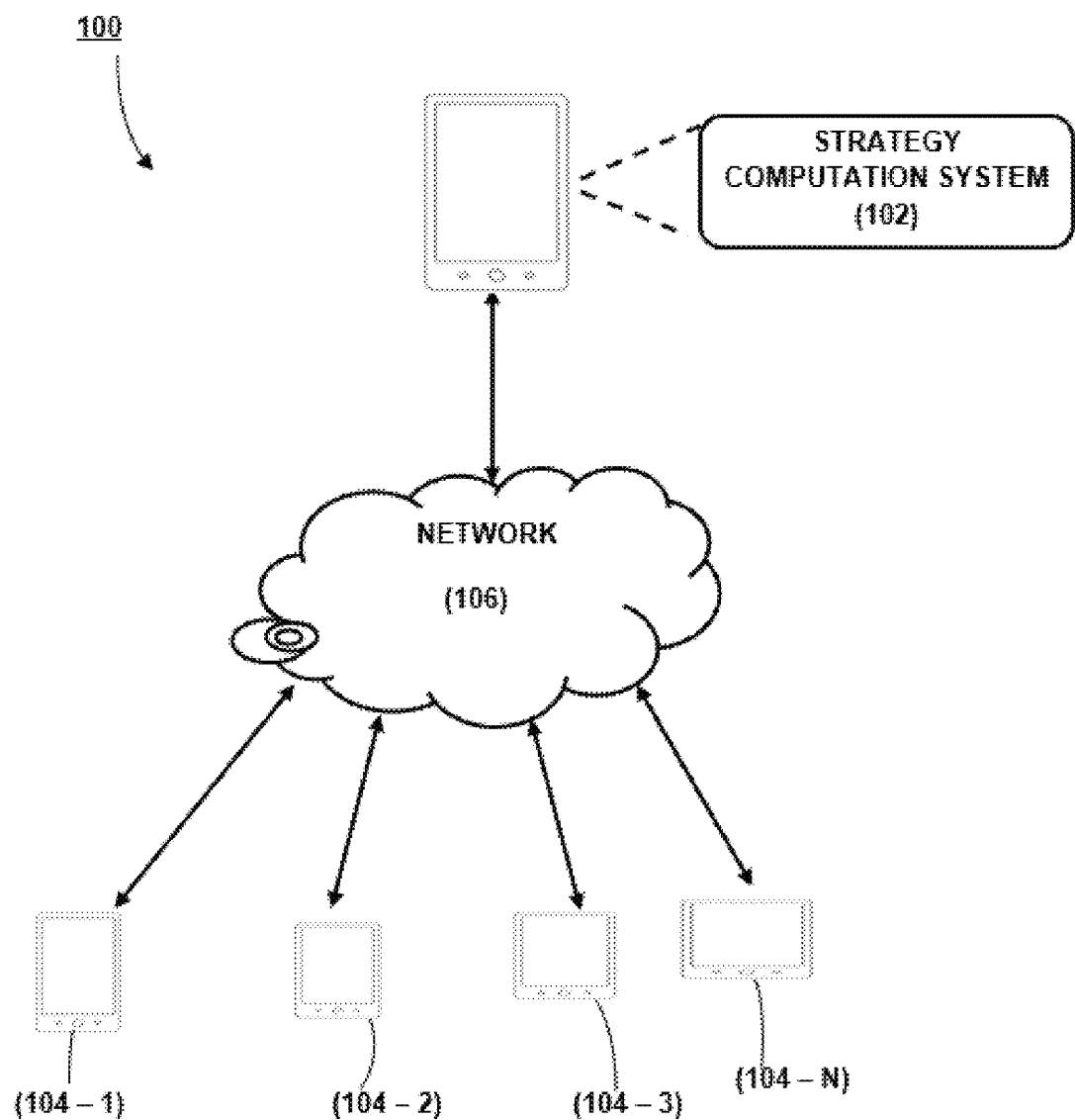
FIG. 1 illustrates a network implementation of a strategy computation system for determining an optimal strategy pertaining to a business opportunity is shown, in accordance with an embodiment of the present disclosure.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise. Although any apparatuses and methods similar or equivalent to those described herein can be used in the practice or testing of embodiments of the present disclosure, the exemplary, apparatuses and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

It must be understood that a strategy is a plan of action designed to achieve a designated goal. A business opportunity, on the other hand, is a set of circumstances that comes along the way of a business operation and which needs to be handled strategically in order to promote the business. Though a lot of business opportunities may come, however handling each opportunity with an optimal strategy is the key to success. To do so, the present invention facilitates to determine the optimal strategy pertaining to the business opportunity is disclosed.

It may be understood that a set of strategies may be pre-stored in a system database. It may further be understood that each strategy, of the set of strategies, may be associated to one or more business opportunities. Out of the set of strategies, the strategy computation system filters a subset of the set of strategies. The subset, filtered, may be associated to the business. In other words, the subset are the strategies that may be applicable to the business. This is because strategies present in the subset are in line with the business opportunity. Subsequent to the filtration, each strategy of the subset may be analyzed to determine an impact of the strategy. In one embodiment, the impact may indicate profitability of the business. In other words, each strategy may be analyzed to indicate whether such strategy when implemented will result into profit for the business. If the profit, upon adoption of the strategy, is greater than a predefined threshold profit, then the strategy computation system may determine such strategy as an optimal strategy for the business opportunity. Thus, in this manner, the strategy computation system determines the optimal strategy pertaining to the business opportunity.

While aspects of described system and method for determining the optimal strategy pertaining to the business opportunity may be implemented in any number of different computing systems, environments, and/or configurations, the embodiments are described in the context of the following exemplary system.

Referring now to FIG. 1, a network implementation 100 of a strategy computation system 102 for determining an optimal strategy pertaining to a business opportunity is disclosed. In order to determine the optimal strategy, initially, the strategy computation system 102 stores a set of strategies in a system database 218. In one aspect, each strategy, of the set of strategies, may be associated to one or more business opportunities. Subsequently, the strategy computation system 102 selects a subset of the set of strategies applicable to a business opportunity of the one or more business opportunities. In one aspect, the subset may be selected based on a set of parameters associated to the business opportunity. Post selection of the subset, the strategy computation system 102 analyzes each strategy of the subset by using one or more predefined computational libraries. In one aspect, a strategy, of the subset, may be analyzed to determine an impact of the strategy. After analyzing each strategy, the strategy computation system 102 determines one or more strategies, of the subset, to be implemented based on the impact, pertaining to the one or more strategies, and a set of Key Performance Indicators (KPI) associated to the business opportunity thereby determining an optimal strategy pertaining to the business opportunity.

Although the present disclosure is explained considering that the strategy computation system 102 is implemented on a single server, it may be understood that the strategy computation system 102 may also be implemented in a Distributed Computing Environment (DCE), involving variety of computing systems operating in parallel. Examples of the computing systems may include, but not limited to, a laptop computer, a desktop computer, a notebook, a workstation, a mainframe computer, a server, a network server, and the like. It will be understood that the strategy computation system 102 may be accessed by multiple users through one or more user devices 104-1, 104-2, 104-3; 104-N. In one implementation, the strategy computation system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the strategy computation system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
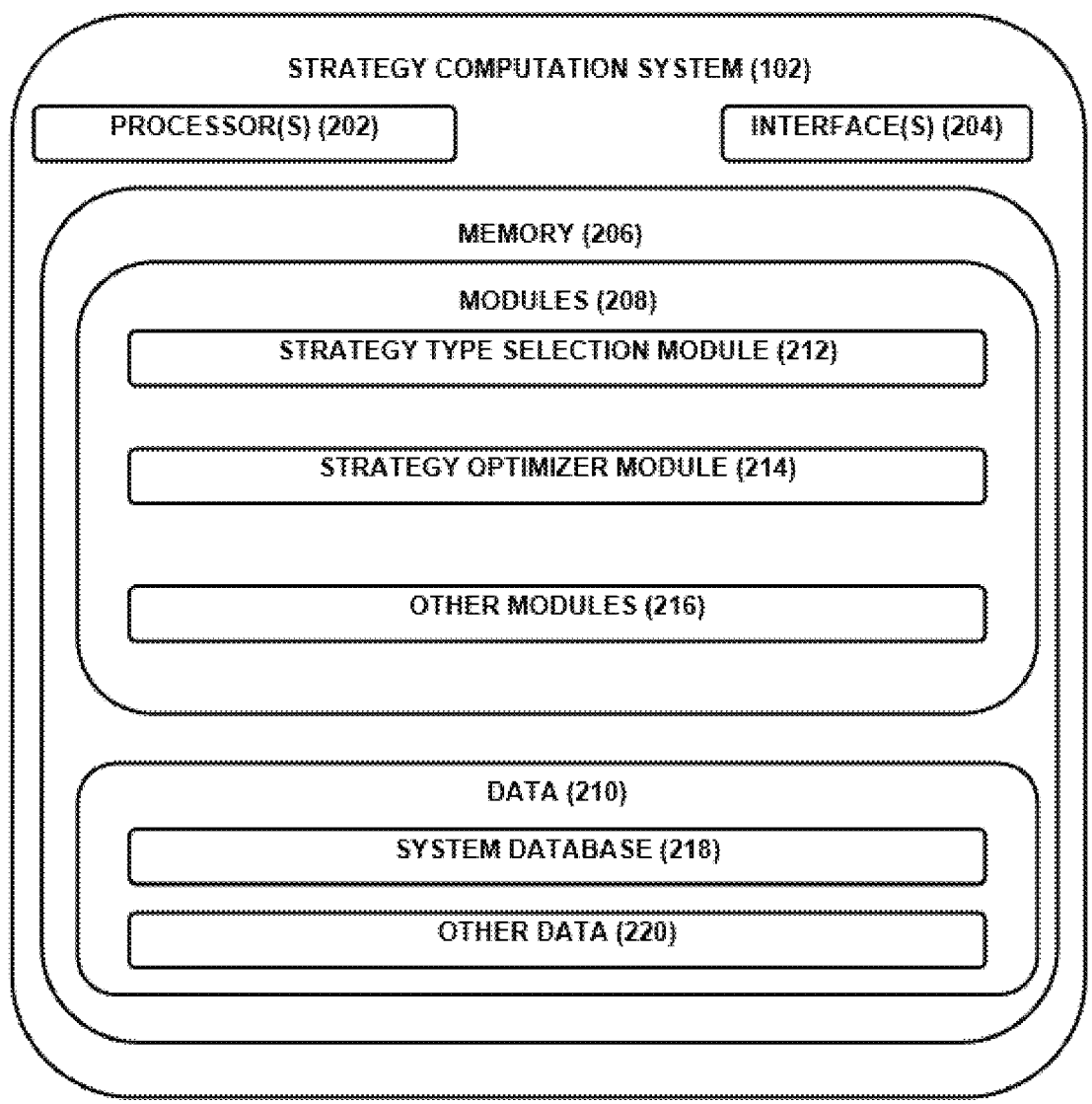
FIG. 2 illustrates the strategy computation system, in accordance with an embodiment of the present disclosure.

Referring now to FIG. 2, the strategy computation system 102 is illustrated in accordance with an embodiment of the present subject matter. In one embodiment, the strategy computation system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the strategy computation system 102 to interact with the user directly or through the client devices 104. Further, the I/O interface 204 may enable the strategy computation system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a strategy type selection module 212, a strategy optimizer module 214, and other modules 216. The other modules 216 may include programs or coded instructions that supplement applications and functions of the strategy computation system 102. The modules 208 described herein may be implemented as software modules that may be executed in the cloud-based computing environment of the strategy computation system 102.

The data 210, amongst other things, serves as a repository for storing data processed, received, and generated by one or more of the modules 208. The data 210 may include data generated as a result of the execution of one or more modules in the other modules 224. Further, the data 210 may include a system database 218 and other data 220. In one aspect, the system database 220 may comprise opportunity type knowledge object, opportunity detection knowledge object, and opportunity instance knowledge object. The other data 220 may include data generated as a result of the execution of one or more modules in the other modules 216. The detailed description of the modules 210 along with other components of the strategy computation system 102 is further explained by referring to FIG. 2.

As there are various challenges observed in the existing art, the challenges necessitate the need to build the strategy computation system 102 for determining an optimal strategy pertaining to a business opportunity. In order to determine the optimal strategy, at first, a user may use the user device 104 to access the strategy computation system 102 via the I/O interface 204. The user may register them using the I/O interface 204 to use the strategy computation system 102. In one aspect, the user may access the I/O interface 204 of the strategy computation system 102. To determine the optimal strategy, the strategy computation system 102 may employ the strategy type selection module 212 and the strategy optimizer module 214. The detail functioning of the modules is described below with the help of figures.

In one implementation, the strategy computation system 102 addresses the challenges observed in the existing art. More specifically, the strategy computation system 102 facilitates to determine a strategy for the business opportunity (hereinafter also referred to as opportunity) in an optimal manner The strategy represents a class of strategies which require similar actions for implementation. For example, consider an opportunity as an 'Excess Stock Prevention Opportunity' in the retail sector. This opportunity indicates that a situation has been detected where the strategy computation system 102 predicts with high confidence that an excess stock scenario might occur in the near future. In one aspect, the excess stock has a cost associated with it and thus, preventing it will cause a net saving. There are various ways (referred to as strategies) of dealing with the excess stock. Examples of the strategies may include, but not limited to, Reduce Price (Price Reduction), Cross-sell with another product (Product Bundling), Transfer to another store (Inter-store Transfer), Mark Down on Maximum Retail Price (MRP), and Loyalty Points.

There are five different strategies. For example, 'Price Reduction' is a strategy type and 'reduce price by 5% for next 5 days' is one particular strategy of 'Price Reduction' strategy type. Strategy Type levers for 'Price Reduction' are: 'Percentage Discount' and 'Discounting Schedule'. By varying 'percentage discount' and 'discounting schedule', many different strategies of 'Price Reduction' strategy type may be determined.

Likewise, 'Inter-Store Transfer' is a strategy type and 'Transfer 100 units to Store #68 on Tuesday' is a particular instance of 'Inter-Store Transfer' strategy. The strategy levers are 'Units to Transfer', 'Stores to transfer to' and 'date of transfer'.

It may be understood that there is a cost associated with the implementation of strategies. The costs should be less than the losses incurred by the excessive stock otherwise a particular strategy may not be attractive. Furthermore, there is a lead-time involved in implementing the strategy. If one does not have enough time to implement the strategy, there is no use in considering the strategy.

Given an opportunity instance, the strategy computation system 102 first determines a feasible set of strategy and then determines one or more optimal strategies amongst the feasible set of strategy. In order to determine the feasible set of strategy and thereby the optimal strategy, the strategy computation system 102 may employ the strategy type selection module 212 and the strategy optimizer module. The detailed functioning of the modules is given below. For the above and other reasons, given an opportunity instance, not all applicable strategies may be feasible.

In one aspect, for each type of opportunity, the strategy type selection module 212 stores a predefined set of strategies, pertaining to one or more business opportunities, in the system database 218. Amongst the predefined set of strategies, the strategy type selection module 212 selects a subset of the predefined set of strategies applicable to a business opportunity of the one or more business opportunities. In one aspect, the subset may be selected based on a set of parameters associated to the business opportunity.

For example, (1), if the business opportunity is 'Excess Stock Prevention Opportunity', then the subset of the predefined set of strategies applicable to 'Excess Stock Prevention Opportunity' may include, but not limited, 'Reduce Price (Price Reduction)', 'Cross-sell with another product (Product Bundling)', 'Transfer to another store (Inter-store Transfer)', 'Mark Down on Maximum Retail Price (MRP)', and 'Loyalty Points'. It must be understood that the aforementioned strategies are selected based on the set of parameters including, but not limited to, 'a type of Stock Keeping Unit (SKU)', 'a business policy', and 'a price of SKU'.

After selection of the subset, the strategy optimizer module 214 analyzes each strategy of the subset by using one or more predefined computational libraries/solvers. Examples of the predefined computational libraries/solvers may include, but not limited to, GNU Linear Programming Kit, SCIP, CLP, LP SOLVE, SoPlex and well known commercial solvers such Cplex, Xpress, and Gurobi. It may be noted that a lot of computations may be performed for analyzing each strategy. Therefore, the strategy optimizer module 214 may employ distributed computing resources that facilitate to perform the computations in parallel on distributed computing environment. In one aspect, a strategy, of the subset, may be analyzed to determine an impact of the strategy. In one aspect, the impact indicates a profit to be attained, when the strategy is implemented for the business opportunity.

To elucidate further, consider the example (1) same as aforementioned. Since 'Reduce Price (Price Reduction)', 'Cross-sell with another product (Product Bundling)', 'Transfer to another store (Inter-store Transfer)', 'Mark Down on Maximum Retail Price (MRP)', and 'Loyalty Points' are selected as the strategies to be implemented for the business opportunity i.e. 'Excess Stock Prevention Opportunity', the strategy optimizer module 214 individually analyzes each strategy to determine the impact of the strategy. Though each of the aforementioned strategies may help in preventing the 'Excess Stock' situation in a warehouse. However, each individual strategy, when implemented, may lead to distinct profit margins. Therefore, it becomes essential to determine the impact of the strategy. It may be noted that the impact, in this example, indicates the profitability of the business when such strategy is implemented.

In one example, 'Reduce Price (Price Reduction)' strategy, when implemented, leads to '20%' profit. Similarly, 'Cross-sell with another product (Product Bundling)', when implemented, leads to 30% profit. Likewise, other three strategies (i.e. 'Transfer to another store (Inter-store Transfer)', 'Mark Down on Maximum Retail Price (MRP)', and 'Loyalty Points'), when implemented individually, lead to 25%, 35%, and 10% respectively.

Post analysis, the strategy optimizer module 214 determines one or more strategies of the subset to be implemented based on the impact, pertaining to the one or more strategies, and a set of Key Performance Indicators (KPI) associated to the business opportunity. The set of KPI comprises 'business policy', 'brand' and 'profit'. In the above example (1), the strategy optimizer module 214 determines 'Mark Down on Maximum Retail Price (MRP)' as the optimal strategy for the 'Excess Stock Prevention Opportunity'. This is because '35%' profit (highest amongst the other strategies) may be provided when the 'Mark Down on Maximum Retail Price (MRP)' is implemented.

However, there may be scenario where the 'Mark Down on Maximum Retail Price (MRP)' strategy is not defined in the 'business policy'. In such cases, the strategy optimizer module 214 determines 'Cross-sell with another product (Product Bundling)' (considering 'Cross-sell with another product or Product Bundling is defined in the 'business policy') as the optimal strategy because it may lead to '30%' profit when implemented. In yet another embodiment, the strategy optimizer module 214 may determine one or more of the above five strategies as the optimal strategies based on the impact and the KPIs. Thus, in this manner, the strategy computation system 102 determining the optimal strategy pertaining to the business opportunity in a cognitive framework.

Figure 3:
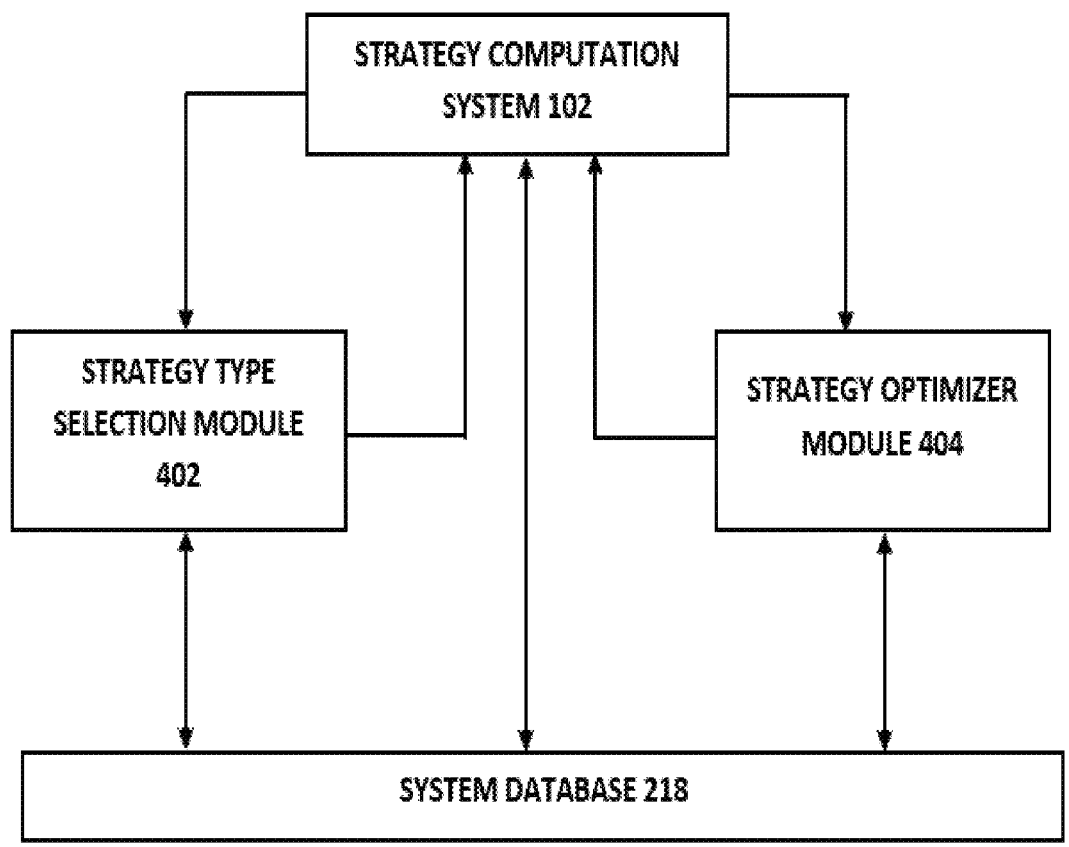
FIG. 3 illustrates the top level flow of messages in the strategy computation system, in accordance with an embodiment of the present disclosure.

Referring to FIG. 3 shows the top level flow of messages in the strategy computation system 102, using the message types listed in table 1. In one embodiment, the below table 1 shows top level message types used by the strategy computation system 102 while determining the optimal strategy pertaining to the business opportunity. The detailed description of the flow of messages illustrated in the FIG. 3 is described below.

| Message Types used by the strategy computation system 102 | | | |
|---|---|---|---|
| Message Type | Producer Module | Consumer Module | Description |
| S-C-Start (Strategy Computation Start) | Strategy Planning System (not shown) | Strategy Computation System 102 | This message triggers analysis to derive an optimal strategy for addressing the new opportunity. |
| S-TS-Start (Strategy Types Selection Start) | Strategy Computation System 102 | Strategy Type Selection 212 | This message triggers analysis to select a feasible set of strategy types for addressing the new opportunity. |
| S-TS-Done (Strategy Types Selection Done) | Strategy Type Selection Module 212 | Strategy Computation System 102 | This message is emitted after completion of strategy types selection |
| S-O-Start (Strategy Optimization Start) | Strategy Computation System 102 | Strategy Optimizer Module 214 | This message triggers problem solving to compute optimal strategy. |
| S-O-Done (Strategy Optimization Done) | Strategy Optimizer Module 214 | Strategy Computation System 102 | This message is emitted after completion of optimal strategy computation. |
| S-C-Done | Strategy Computation System 102 | Strategy Planning System (not shown) | This message is emitted after receiving S-O-Done message for the newly created opportunity instance. |

In Initialization Phase, the strategy computation system 102 performs the following initialization activities:
/* Set up connections to external message queues */
1. Using Messaging service, register as consumer to S-O-Start messages queue, created by the strategy computation system 102.
2. Using Messaging service, register as producer to S-O-Done messages queue created by the strategy computation system 102.
3. For entries in Opportunity Types Knowledge Object (OTS-KO):
   a) Get the next entry (Opportunity Type Knowledge Object), say OT-KO
   b) Using messaging service, create S-TS-Start, S-TS-Done, S-PS-Start, and S-PS-Done message queues for opportunity type OT-KO.
   c) Register as producer to S-TS-Start and S-PS-Start message queues.
   d) Register as consumer to S-TS-Done and S-PS-Done message queues.
4. For entries in Opportunity Types Knowledge Object (OTS-KO):
   a) Get the next entry (Opportunity Type Knowledge Object), say OT-KO
   b) Start an instance of the strategy type selection module 212, passing it the reference to OT-KO
   c) Start an instance of the strategy optimizer module 214, passing it the reference to OT-KO In Execution Phase, the strategy computation system 102 executes the following activities concurrently:
1. Upon receiving a S-TS-Done (strategy type selection done) message from the strategy type selection module 212, perform the following:
   a) Create a new S-PS-Start message
   b) Get the reference to OX-KO (Opportunity Instance Knowledge Object) from S-TS-Done message and insert it in the S-PS-Start message created in step a.
2. Using the messaging service, append the above message to S-PS-Start messages queue for the corresponding opportunity type.
3. Upon receiving a S-PS-Done (Strategy problem solver Done) message from the strategy optimizer module 214, perform the following:
   a) Create a new S-O-Done message
   b) Get the reference to OX-KO (Opportunity Instance Knowledge Object) from S-PS-Done message and insert it in the S-O-Done message created in step a.
   c) Using the messaging service, append the above message to S-O-Done messages queue.
/* Listen to exception/error messages from the strategy type selection module 212 and the strategy optimizer module 214 */
1. Upon receiving an exception message from a Strategy Types Selection Module (10511) or Strategy Optimizer Module (10512), perform the following:
   a) If exception can be handled at the strategy computation system 102, invoke exception handling mechanism of the strategy computation system 102. This may involve stopping and restarting the strategy type selection module 212 and the strategy optimizer module 214; otherwise forward an exception message to a strategy planning system.
/* Listen to administrative requests */
1. Administrative user can interact with Strategy Computation Module to:
   a) View the status of strategy optimization progress
   b) View errors and logs
   c) Stop and restart the strategy type selection module 212
   d) Stop and restart the strategy optimizer module 214

In Termination Phase, the strategy computation system 102 continues to be active after initialization until, the strategy computation system 102 halts or there is some fault in the system which brings it down. In the latter case, the systems fault-recovery mechanism kicks in to restart the strategy computation system 102.

In one embodiment, the strategy type selection module 212 may be running concurrently in the strategy computation system 102. In one aspect, there is one strategy type selection module for each opportunity type. In alternate embodiments, several strategy type selection modules may be associated with the same opportunity type. It may be understood that the strategy type selection module 212 may run on a single machine or the strategy type selection module 212 may be a distributed program running on a cluster of machines. All instances of the strategy type selection module 212 may be started in parallel on different machines in a cluster of machines.

The strategy type selection module 212 accepts S-TS-Start (Strategy Types Selection Start) message with a reference to Opportunity Instance Knowledge Object (OX-KO) and after execution, it emits S-TS-Done (Symptoms Types Selection Done) message with a reference to the received opportunity instance knowledge object (OX-KO) with a list of feasible strategy types. The strategy type selection module 212 takes opportunity instance knowledge object and strategy types specification for an opportunity type. In one embodiment, the strategy type selection module 212 is designed as a generic specification driven program.

The Behavior Description of the strategy types selection module 212 is described below:

In Initialization Phase, the strategy types selection module 212 performs the following initialization activities:
1. Let OT is the opportunity type associated with this instance (available from the parameter opportunity type knowledge object, OT-KO, passed with the start request.)
2. Using Messaging service, register as consumer to S-TS-Start messages queue for opportunity type OT, created by the strategy computation system 102.
3. Using Messaging service, register as producer to S-TS-Done messages queue for opportunity type OT, created by the strategy computation system 102.
4. From the associated Opportunity Type Knowledge Object, OT-KO, get the array of strategy Types (OT-Strategy-Types) and/or the array of methods/functions (OT-Strategy-Types-Selector-Functions). OT-Strategy-Types-Selector-Functions are analytics programs that are used to test whether a strategy type is feasible for a given opportunity instance.
5. Using the information from step (4), configure strategy type selection code in the strategy type selection module 212.

Execution Phase, the strategy types selection module 212 runs in a loop performing the following:
1. Upon receiving a new S-TS-Start message, perform the following:
   a) Let OX-KO be the opportunity instance knowledge object associated with S-TS-Start message.
   b) Let STS-KO be the strategy types knowledge object associated with OX-KO
   c) Create a new Object, say AFS-KO (Array of Feasible Strategies Knowledge Object), and associate it with OX-KO.
   d) For each entry, ST-KO, in STS-KO
      i. Check if the strategy in ST-KO is feasible for the current opportunity instance OX-KO
      ii. If the strategy in ST-KO is feasible, insert ST-KO in AFS-KO
   e) Create a new S-TS-Done message, and associate it with OX-KO
   f) Using messaging service, append S-TS-Done message to S-TS-Done messages queue.
   g) Using logging service, log a strategy types selection record.

In Termination Phase, the strategy type selection module 212 may be started/restarted at the beginning of each iteration of the Strategy Optimization loop and terminated at the end of the iteration. Alternately, the strategy type selection module 212 may be kept running waiting for the next iteration after computing strategy for the current opportunity instance for the current iteration. If the strategy type selection module 212 halts because of failure, the strategy computation system 102 fault recovery mechanism kicks in to restart the strategy type selection module 212.

The strategy optimizer module 214 is running concurrently in the strategy computation system 102. Each such module may be associated with an opportunity type. In a simple embodiment, there is one strategy optimizer module for each opportunity type. In alternate embodiments, several strategy optimizer modules may be associated with the same opportunity type. Also, one strategy optimizer module can also be associated with multiple opportunity types.

The strategy optimizer module 214 may run on a single machine or it can be a distributed program running on a cluster of machines. All instances of the strategy optimizer module 214 may be started in parallel on different machines in a cluster of machines. One or more strategy optimizer modules can also be started on a single machine.

The strategy optimizer module 214 accepts S-O-Start (Strategy Optimization Start) message with a reference to Opportunity Instance Knowledge Object (OX-KO) and after execution, it emits S-O-Done (Strategy Optimization Done) message with a reference to the received opportunity instance knowledge object (OX-KO) with optimal strategy.

The Behavior Description of the strategy optimizer module 214 is described below:

In Initialization Phase, the strategy optimizer module 214 performs the following initialization activities:
1. Let OT is the opportunity type associated with this instance (available from the parameter opportunity type knowledge object, OT-KO, passed with the start request.)
2. Using Messaging service, register as consumer to S-O-Start messages queue for opportunity type OT, created by the strategy computation system 102.
3. Using Messaging service, register as producer to S-O-Done messages queue for opportunity type OT, created by the strategy computation system 102.
4. From the associated Opportunity Type Knowledge Object, OT-KO, get the array of Strategy Types (OT-Strategy-Types) and/or the array of methods/functions (OT-Strategy-Optimizer-Functions). OT-Strategy-Optimizer-Functions are optimization programs that are used to find an optimal strategy for a given opportunity instance.
5. Using the information from step (4), configure strategy optimizer code in the strategy optimizer module 214.

In Execution Phase, the strategy optimizer module 214 runs in a loop performing the following:
1. Upon receiving a new S-O-Start message, perform the following:
   a) Let OX-KO be the opportunity instance knowledge object associated with S-O-Start message.
   b) Let STS-KO be the strategy types knowledge object associated with OX-KO
   c) Create a new Object, say AFS-KO (Array of Feasible Strategies Knowledge Object), and associate it with OX-KO.
   d) For each entry, ST-KO, in STS-KO
      i. Check if the strategy in ST-KO is feasible for the current opportunity instance OX-KO ii. If the strategy in ST-KO is feasible, insert ST-KO in AFS-KO e) Create a new S-O-Done message, and associate it with OX-KO f) Using messaging service, append S-O-Done message to S-O-Done messages queue.

g) Using logging service, log a strategy problem solver record.

In Termination Phase, the strategy optimizer module 214 may be started/restarted at the beginning of each iteration of the strategy optimization loop and terminated at the end of the iteration. Alternately, the strategy optimizer module 214 may be kept running waiting for the next iteration after computing strategy for the current opportunity instance for the current iteration. If the strategy optimizer module 214 halts because of failure, the strategy computation system 102 fault recovery mechanism kicks in to restart the strategy optimizer module 214.

Figure 4:
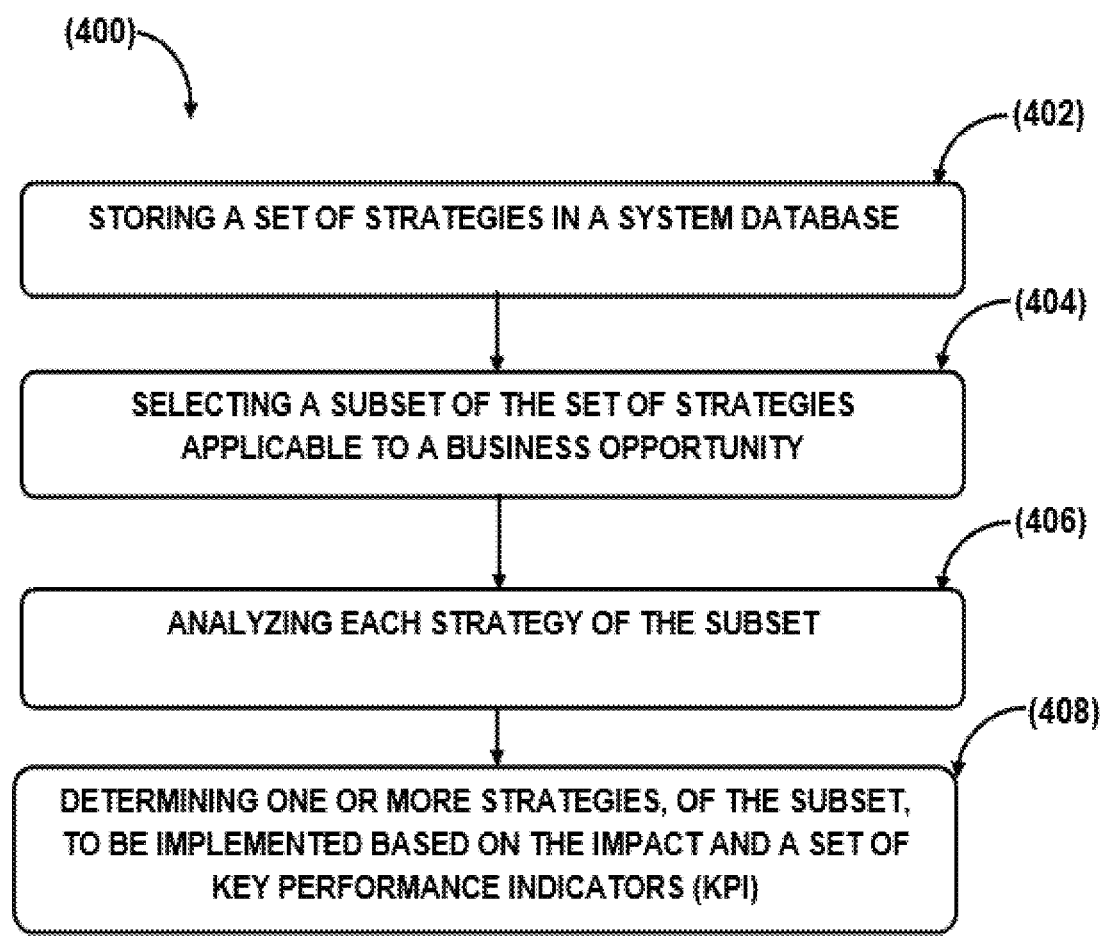
FIG. 4 illustrates a method for determining the optimal strategy pertaining to the business opportunity is shown, in accordance with an embodiment of the present disclosure.

Referring now to FIG. 4, a method 400 for determining an optimal strategy pertaining to a business opportunity is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the strategy computation system 102.

At block 402, a set of strategies may be stored in a system database 218. In one aspect, each strategy, of the set of strategies, may be associated to one or more business opportunities. In one implementation, the set of strategies may be stored by the strategy type selection module 212.

At block 404, a subset of the set of strategies applicable to a business opportunity of the one or more business opportunities may be selected. In one aspect, the subset may be selected based on a set of parameters associated to the business opportunity. In one implementation, the subset may be selected by the strategy type selection module 212.

At block 406, each strategy of the subset may be analyzed by using one or more predefined computational libraries. In one aspect, a strategy, of the subset, may be analyzed to determine an impact of the strategy. In one implementation, each strategy of the subset may be analyzed by the strategy optimizer module 214.

At block 408, one or more strategies of the subset, to be implemented, may be determined based on the impact, pertaining to the one or more strategies, and a set of Key Performance Indicators (KPI) associated to the business opportunity. In one implementation, the one or more strategies, to be implemented, may be determined by the strategy optimizer module 214.

Thus, in this manner, the strategy computation system 102 determines the optimal strategy pertaining to the business opportunity. Although implementations of a method and system for determining the optimal strategy pertaining to the business opportunity have been described in language specific to structural features and/or methods, it is to be understood that the implementations and/or embodiments are not necessarily limited to the specific features or methods described.

The invention claimed is:

1. A method for determining an optimal strategy in a cognitive framework, the method comprising:

storing, by a processor, a set of strategies in a system database, wherein each strategy, of the set of strategies, is associated to one or more opportunities;

filtering, by the processor, a subset of the set of strategies applicable to an opportunity of the one or more opportunities, wherein the subset is filtered based on a set of parameters associated to the opportunity;

automatically determining, by the processor, an impact for each strategy of the subset in real-time by using one or more predefined computational libraries, wherein the one or more predefined computational libraries are computed in parallel to each other on a distributed computing environment, and wherein the impact indicates a profit to be attained when the strategy is implemented for the opportunity, and wherein the computational libraries include GNU Linear Programming Kit, SCIP, CLP, LP SOLVE, SoPlex, Cplex, Xpress, and Gurobi;

automatically determining, by the processor, one or more strategies of the subset based on the impact and a set of Key Performance Indicators (KPI) associated to the opportunity, wherein the optimal strategy is determined in a cognitive framework by comparing the impact of each strategy with a predefined threshold impact, and wherein the optimal strategy has a highest impact as compared to the impact of each strategy of the one or more strategies;

implementing, by the processor, the optimal strategy in real-time on one or more activities within an organization; and initiating, by the processor, a fault recovery mechanism for the optimal strategy when a computation of the optimal strategy is failed, wherein the fault recovery mechanism restarts the computation of the optimal strategy.

2. The method of claim 1, wherein the set of parameters comprises a type of Stock Keeping Unit (SKU), a business policy, and a price of SKU.

3. The method of claim 2, wherein the one or more strategies comprises a Give Discount on the type of SKU, a Mark Down on a Maximum Retail Price (MRP), a Product Bundling, an Inter-store Transfer, Loyalty Points, and a Price Reduction.

4. The method of claim 1, wherein the set of KPI comprises a business policy, a brand and a profit, a promotion effectiveness, a customer retention, and sales.

5. A strategy computation system for determining an optimal strategy in a cognitive framework, the strategy computation system comprising:

a processor; and a memory coupled to the processor, wherein the processor is capable of executing a plurality of modules stored in the memory, and wherein the plurality of modules comprising:

a strategy type selection module for storing a set of strategies in a system database, wherein each strategy, of the set of strategies, is associated to one or more opportunities, and filtering a subset of the set of strategies applicable to an opportunity of the one or more opportunities, wherein the subset is filtered based on a set of parameters associated to the opportunity; and a strategy optimizer module for automatically determining an impact for each strategy of the subset in real-time by using one or more predefined computational libraries, wherein the one or more predefined computational libraries are computed in parallel to each other on a distributed computing environment, and wherein the impact indicates a profit to be attained when the strategy is implemented for the opportunity, and wherein the computational libraries include GNU Linear Programming Kit, SCIP, CLP, LP SOLVE, SoPlex, Cplex, Xpress, and Gurobi;

automatically determining one or more strategies of the subset based on the impact and a set of Key Performance Indicators (KPI) associated to the opportunity, wherein the optimal strategy is determined in a cognitive framework by comparing the impact of each strategy with a predefined threshold impact, and wherein the optimal strategy has a highest impact as compared to the impact of each strategy of the one or more strategies;

implementing the optimal strategy in real-time on one or more activities within an organization; and initiating a fault recovery mechanism for the optimal strategy when a computation of the optimal strategy is failed, wherein the fault recovery mechanism restarts the computation of the optimal strategy.

6. The strategy computation system of claim 5, wherein the set of parameters comprises a type of Stock Keeping Unit (SKU), a business policy, and a price of SKU.

7. The strategy computation system of claim 6, wherein the one or more strategies comprises a Give Discount on the type of SKU, a Mark Down on a Maximum Retail Price (MRP), a Product Bundling, an Inter-store Transfer, Loyalty Points, and a Price Reduction.

8. The strategy computation system of claim 5, wherein the set of KPI comprises a business policy, a brand and a profit.

9. A non-transitory computer readable medium embodying a program executable in a computing device for determining an optimal strategy in a cognitive framework, the program comprising a program code:

a program code for storing a set of strategies in a system database, wherein each strategy, of the set of strategies, is associated to one or more opportunities;

a program code for filtering a subset of the set of strategies applicable to an opportunity of the one or more opportunities, wherein the subset is filtered based on a set of parameters associated to the opportunity;

a program code for automatically determining an impact for for each strategy of the subset in real-time by using one or more predefined computational libraries, wherein the one or more predefined computational libraries are computed in parallel to each other on a distributed computing environment, and wherein the impact indicates a profit to be attained when the strategy is implemented for the opportunity, and wherein the computational libraries include GNU Linear Programming Kit, SCIP, CLP, LP SOLVE, SoPlex, Cplex, Xpress, and Gurobi;

a program code for automatically determining one or more strategies of the subset based on the impact and a set of Key Performance Indicators (KPI) associated to the opportunity, wherein the optimal strategy is determined in a cognitive framework by comparing the impact of each strategy with a predefined threshold impact, and wherein the optimal strategy has a highest impact as compared to the impact of each strategy of the one or more strategies;

a program code for implementing the optimal strategy in real-time on one or more activities within an organization; and a program code for initiating a fault recovery mechanism for the optimal strategy when a computation of the optimal strategy is failed, wherein the fault recovery mechanism restarts the computation of the optimal strategy.

* * * * *